March 21, 1939. C. J. CHRISTENSEN ET AL 2,151,083

MICROPHONIC MATERIAL

Filed Feb. 7, 1936    2 Sheets-Sheet 1

INVENTORS: C. J. CHRISTENSEN
F. S. GOUCHER
H. G. WEHE

BY
ATTORNEY

March 21, 1939.  C. J. CHRISTENSEN ET AL  2,151,083
MICROPHONIC MATERIAL
Filed Feb. 7, 1936   2 Sheets-Sheet 2

INVENTORS: C. J. CHRISTENSEN
F. S. GOUCHER
H. G. WEHE
BY
ATTORNEY

Patented Mar. 21, 1939

2,151,083

UNITED STATES PATENT OFFICE 2,151,083

MICROPHONIC MATERIAL

Carl J. Christensen, Flushing, N. Y., and Frederick S. Goucher, Short Hills, and Herman G. Wehe, Summit, N. J., assignors to Bell Telephone Laboratories, Incorporated, New York, N. Y., a corporation of New York Application February 7, 1936, Serial No. 62,786

7 Claims. (Cl. 179—190)

This invention relates to microphonic materials and to methods of producing them.

An object of the present invention is to obtain improved materials suitable for use in microphones and the like.

Another object of the invention is an improved method for producing microphonic materials.

Heretofore the general practice has been to use finely divided carbon as the modulating or resistance-varying material for microphones, such as the ordinary telephone transmitter. One method of preparing this material is to procure a high grade of anthracite coal, reduce it to a granular state, and then subject it to a heat treatment. Also it has been proposed to produce microphonic materials by applying a coating of different metals to carbon particles or to glass particles and also by applying a layer of carbon to metal particles.

While the foregoing materials have been suggested in the past, it has long been recognized that carbon possesses several characteristics that are highly desirable for a good microphonic substance. For example, its oxide, unlike that of most metals and other substances, is a gas which does not deposit a solid contaminating film over the surface of the particle. Again it possesses certain properties necessary to good modulation, such as elasticity and hardness, and at the same time offers a contact resistance of an appropriate value to meet the requirements of a microphone, and, as compared with other materials, its contact temperature is low for given values of applied potential. Also its elastic and plastic properties are well suited to good microphonic action, which requires predominance of elasticity and a minimum of plasticity.

One of the features of the present invention is a microphonic material which retains the desirable characteristics of carbon and at the same time possesses certain advantages not present in any of the materials heretofore used. To this end we have found that by selecting certain materials, preferably those of the refractory type, reducing them to fine particles, and subjecting these particles to certain heat treatment it is possible to greatly reduce the apparent density of the resultant material by reason of the fact that numerous gas inclusions within the body of the particle are expanded by the applied heat and are entrapped within the particle by a continuous external surface that forms from the fused material of the particle. By selecting from these enlarged particles those of the proper size and density and depositing upon them a coat of carbon, a microphonic material is obtained having all the desirable attributes of pure carbon and in addition having a relatively low density. As will be discussed in detail later, this characteristic of low density is one that enhances the usefulness of the material for microphonic purposes.

Another feature of the invention is the method of producing these microphonic particles which, briefly stated, consists in selecting a material known to be rich in minute cells, pores, or internal space enclosures and which will not fuse when subjected to temperatures within a certain range, comminuting said material to obtain granules or particles of desired size, treating said particles under temperatures sufficiently high to fuse the material and cause an intumescence or puffing of the particle due to the entrapping of the gas in the pores or enclosures within the body of the particle, grading the intumesced particles for size, and coating them with a layer of substantially pure carbon by some suitable process.

These and other features and advantages of the invention will be discussed more fully in the following description and in the detailed specification. This specification should be considered in connection with the accompanying drawings, in which.

Figure 1:
Fig. 1 illustrates a portion of microphonic material prepared and ready for heat treatment.

In order to attain the objects and advantages above-mentioned, we realized it would be necessary to derive a material (and also possibly methods for producing it) which would possess those highly desirable characteristics that carbon has long been known to have and which would also be as free as possible of the disadvantages that have been experienced heretofore with microphonic materials made of carbon. Such material should, like carbon, have the right contact resistance for good microphonic action, its contact temperature should remain low for relatively high applied voltages, it should be hard and elastic, and it should remain free from contaminating deposits. An examination of these characteristics indicated that nearly all, if not all, of them could be retained by constructing a microphonic particle which would have an external surface coated with carbon. Accordingly a method was devised for depositing a thin layer of pure carbon on the surface of microphonic particles, such as anthracite carbon. This method, which is the subject of the patent to Goucher et al. 1,973,703 of September 18, 1934, consists in placing comminuted material within a heated chamber and subjecting it to a carbon-yielding gas, such as methane. As a result of this treatment the particles are coated with a thin, hard, and compact layer of substantially pure carbon. Since this coating consists of a molecular deposit from the carbon-yielding gas, it possesses a high degree of uniformity which is, of course, a desirable property for the surface of a microphonic particle. Also, the deposited carbon coating has greater durability, compactness, and homogeneity of structure and consequently is less friable than the surface of ordinary microphonic carbon. It was found, however, that microphonic material made by this carbon deposit process had a somewhat different contact resistance than that of the microphonic carbons previously used. In other words, it was found that the contact resistance between two particles made by the carbon deposit method was somewhat lower than that between similar particles of ordinary microphonic carbon, and, as will be more fully explained hereinafter, this lowered contact resistance of the material prepared by the carbon deposit method was one of the factors that indicated the desirability of securing for the base of the particle a material having lower densities.

One of the disadvantages, alluded to above, of prior microphonic carbon materials is that they undergo a deterioration with age. This deterioration is most prominent on the surface of the particle and results in a change in the contact resistance. Another disadvantage is the tendency of the particle to rupture wherever sharp corners or other abrupt changes occur in the surface. The first of these disadvantages is overcome in a material prepared by the carbon deposit method above described, and the reason is that the deposited carbon layer is much more uniform in its structure than previous microphonic carbons. Also, we perceived that the second-mentioned disadvantage of ordinary carbons could be eliminated, provided a base material could be found which would lend itself to the formation of substantially smooth surfaced particles.

Figure 7:
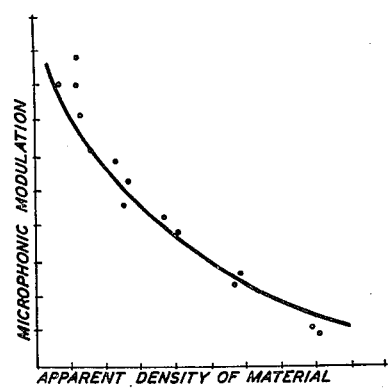
Fig. 7 is a characteristic curve showing the relation between microphonic modulation and apparent density of the material as tested in a particular commercial transmitter.

With the foregoing and other indicated requirements in mind we examined and conducted experiments with a wide variety of substances in an effort to discover and produce one that would give us all of the benefits and none of the disadvantages of the known microphone materials of the prior art, and particularly carbon. Among others we conducted experiments with anthacite carbon, petroleum coke, metallurgical coke, Bakelite, carbonized seeds, silicon carbide, diatomaceous earth, quartz, and a siliceous material commercially known as silica gel. By reducing these materials to a finely divided state and then subjecting them to intense heat, we obtained well-shaped particles of low density, and in the case of silica gel in particular, we were able to greatly enlarge the individual particles by puffing or intumescence, giving us resultant particles of a much lower density than that of the original material. Following this the resultant particles were coated with a surface of substantially pure carbon. The material thus obtained was utilized as a material for a microphone, which was tested by comparing it with a standard microphone using ordinary anthracite carbon as the microphone material. The results of these comparisons are shown in Fig. 7, which will be explained more fully hereinafter. The investigation thus conducted with the different materials demonstrated that those of the refractory type, such as the siliceous compounds, and particularly silica gel and diatomaceous earth, yield particles which prove to be superior in a number of respects to the microphonic particles heretofore produced. In general it may be said that these siliceous materials not only lend themselves to the process of intumescence above-mentioned but possess other properties that are important to good microphonic action.

The substance silica gel, which is particularly well suited to the purposes of this invention, is silicon dioxide with a small quantity of absorbed water or other gases or vapors. One process of obtaining this substance is to treat sodium silicate with sulphuric acid. The reaction may be expressed thus:

$$SiO_2 \cdot XNa_2O(Sol) + H_2SO_4 \rightarrow Na_2SO_4 + SiO_2 \cdot YH_2O$$

By separating the sodium sulphate from the hydrated silicon dioxide, and by dehydrating the latter, the silica gel is obtained. One of the outstanding characteristics of this substance is its porous or cellular structure. The cells or enclosures within a given mass of the substance are extremely small, being either microscopic or submicroscopic, and occur in extremely large numbers. The substance is hard and durable and possesses other of the characteristics of ordinary quartz.

Figure 2:
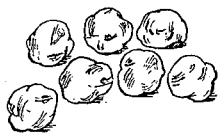
Fig. 2 illustrates a portion of the material after heat treatment.
Figure 3:
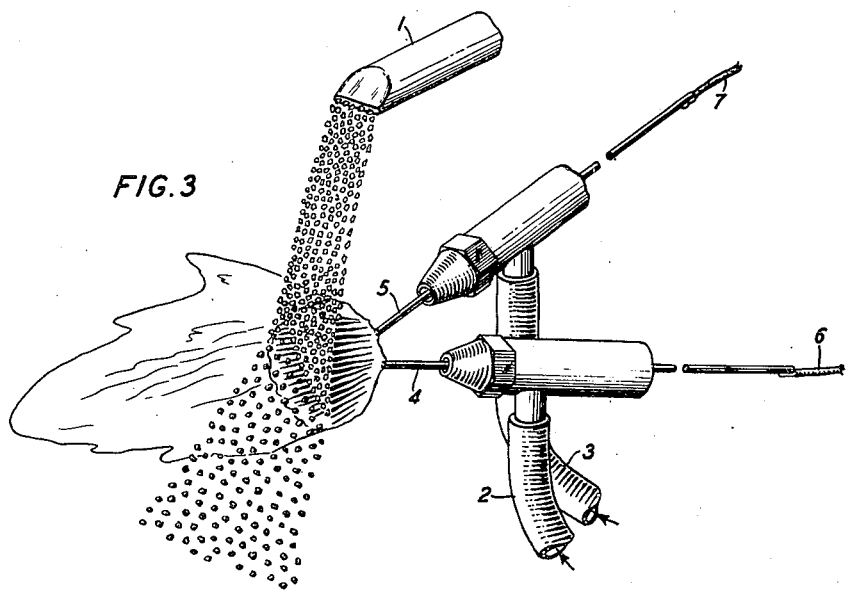
Fig. 3 is a diagrammatic illustration of one form of apparatus suitable for heat-treating the material.

Referring now to the drawings, Fig. 1 shows a specimen, greatly enlarged, of the material, such as silica gel, which has been comminuted and then graded by any suitable method to obtain particles of the desired size. These particles are then subjected to an intense heat by dropping them through an atomic hydrogen flame. This step may be performed by any suitable apparatus, such as the one briefly illustrated in Fig. 3. The material is fed in any convenient manner from a supply through dispensing nozzle 1 positioned above the flame. The flame is produced by disassociating a stream of hydrogen molecules with an electric arc maintained across the tips of nozzles 4 and 5. The stream of hydrogen is fed into the arc from said nozzles, which are connected to supply pipes 2 and 3. The hydrogen atoms thus formed recombine, particularly on the surface of the particles, to reform the hydrogen molecule, and an intense heat is produced in the zone where this recombination occurs. The electric arc is maintained across the tips of the nozzles by any suitable source of potential connected to the nozzles by way of conductors 6 and 7. As a particle enters the flame, the temperature of which is greater than 2000° C., it fuses and assumes a more or less spheroidal shape. The surface of the fused particle becomes smooth and continuous and thus acts as a seal for the numerous internal cells. The gas entrapped in these internal spaces expands rapidly with the increased temperature, puffing or intumescing the particle. The particle leaves the flame well rounded in shape, and having a smooth, hard, continuous surface. Because of the intumescence that has taken place the density of the particle after emerging from the flame is much less than the density of the original particle. The density of a particle of the original substance silica gel is about 2.2, and the particle density of the puffed particle may be as little as one-third or one-quarter of this value. The term "particle density" when applied to a particle means the weight of the particle divided by its volume as measured from its outside envelope. A specimen of the material thus prepared by the fusing process is illustrated in Fig. 2.

Following the puffing operation the resultant material is graded by screening or otherwise to select the particles of the desired sizes. Also a grading as to density may be made by floating the material on liquids of graduated densities to select the particles having the desired density. Having selected the material as to the proper sizes and densities, it is now ready to be coated with carbon.

Figure 4:
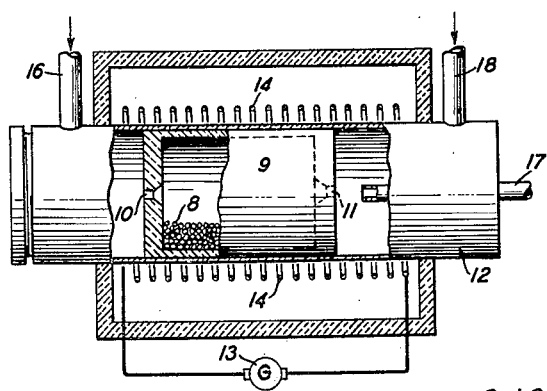
Fig. 4 shows apparatus for coating the prepared material with carbon.

The carbon coating may, if desired, be applied by the process disclosed in the above-mentioned patent to Goucher et al. 1,973,703. Apparatus for performing the coating process is also illustrated briefly in Fig. 4 of the drawings. The prepared material 8 is placed in a cartridge 9 having openings 10 and 11 in the opposite ends thereof. The cartridge 9 is then placed within the heating chamber 12, and current from the source 13 is applied to the heating coil 14. Some carbon-yielding gas, such as methane, is administered to the chamber by the intake pipe 16. This gas passes through the cartridge 9 by way of openings 10 and 11 and leaves the chamber by way of exhaust pipe 17. If desirable some inert gas, such as nitrogen, may be introduced into the chamber 12 by way of pipe 18 for the purpose of sweeping out the interior of the chamber to prevent the deposit of undesirable products. Throughout the carbonizing process the cartridge 9 may be rotated in any suitable way to insure a uniform deposit of the carbon on the surface of the particles 8.

Since the original material fuses at a temperature considerably higher than that required for the deposit of the carbon, such material lends itself readily to these successive steps in the process. The siliceous material does not fuse until some temperature in excess of 1700° C. is reached. The temperature required, however, for depositing the carbon coating on the material may be as low as 1000° C. or 900° C. Therefore, the fused and puffed particles can easily withstand, without injury, the temperatures required for depositing a carbon coating upon their external surfaces.

The prepared material is now ready for use in microphones. It is comprised of small, uniformly shaped particles having centers of the hard, elastic, siliceous material and thin external coatings of substantially pure carbon. These carbon coatings, by reason of the manner in which they are deposited, are extremely uniform, are hard, and are not subject to the aging that usually occurs with ordinary carbon. Because of the intumescence that has taken place in the fusing process, the particle density of the base of the particle is greatly lowered in comparison to the density of the original material and also in comparison to the density of carbon. To give a better conception of these comparative values, it may be stated that the approximate particle densities are: carbon 1.9; fused quartz 2.2; and silica gel 2.0. And the particle density of the puffed silica gel particle is as low as one-third to one-quarter of the density of the material before it is puffed. This low density of the microphonic particle, which has certain distinct advantages to be described presently, has been achieved by the process herein described without sacrificing any of the other properties that are so highly desirable in a good microphonic material.

Figure 5:
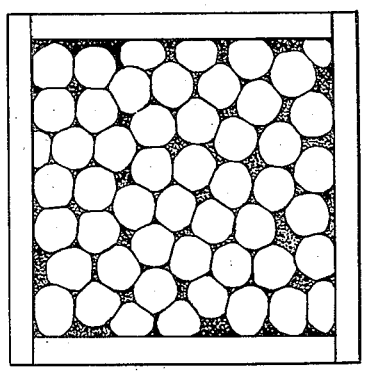
Fig. 5 is a diagrammatic illustration, greatly enlarged, of a portion of the material showing the relative disposition of the particles as they occur within a microphone.

One of the advantages of the lower densities is that a more suitable contact relation between adjacent particles is obtained. As was mentioned hereinbefore, it has been found that the contact resistance between particles having coatings of deposited carbon is somewhat lower than that of ordinary microphonic carbon. However, by lowering the apparent density of the particle, its contact resistance may be held to the values desired for use in microphones. Moreover, by giving the material a lower density, a larger value is secured for the term $$\frac{\Delta R}{R}$$

where R is the resistance between two adjacent particles in contact with each other when the body of microphonic material is at rest and $\Delta R$ is the change that occurs in this resistance when the material is agitated acoustically by the microphone diaphragm. The relation between the density of the particle and its contact resistance is illustrated in Fig. 5. Here a body of the material is shown, largely magnified, as it would occur in a microphone. As adjacent particles within the body of the material bear against each other, they tend to flatten or compress each other by an amount that depends upon the density of the material. This effect, much exaggerated, is shown in the figure.

Figure 6:
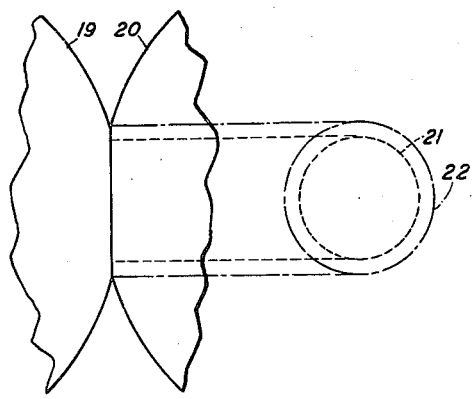
Fig. 6 is a view, greatly enlarged, showing the contact relation between two microphonic particles.

Fig. 6 is a graphical illustration of the contact relation between adjacent particles of the material. Two adjacent particles 19 and 20 in a body of the material compress each other to give a contact surface the shape of which may be assumed to be a circle, and the area of the circle will depend upon the density of the material. The greater the weight of the particles, the more they compress each other; accordingly the greater the density of the particles, the greater the contact area and the less the contact resistance. Therefore, by lowering the density of the particle, the contact resistance of the material may be increased. Assume the particles 19 and 20 to occur within the material of a microphone and that the material is at rest. Under these conditions the two particles 19 and 20 will have a contact area and a contact resistance R which may be expressed by the area of the circle 21. If now the microphonic material is agitated by the movement of the diaphragm, the force of agitation will cause an increase in the force between the two particles 18 and 19, compressing them still further and increasing the contact area to that represented by the circle 22. The difference between the areas of circles 21 and 22 represents the change in resistance $\Delta R$, upon which the microphonic modulation depends. And the smaller the area of circle 21, or the higher the contact resistance when the particles are normal, and the larger the area of circle 22, the more efficient is the modulation. For this reason it is obvious that the low density of the microphonic material produced by this process results in a greatly increased microphonic efficiency.

The high microphonic efficiency of the material above described, compared with that of some of the other materials prepared and tested, is illustrated by the characteristic curve shown in Fig. 7. This curve is plotted with apparent densities as the abscissae and volume of the microphone modulation in a sound field of given intensity as the ordinates. The points shown toward the upper part of the curve represent the performance of microphones having carbon coated silica gel material. The points toward the lower portion of the curve represent the action of materials having higher densities.

It was explained herein that the material produced by this process comprises puffed particles that are more or less spheroidal in shape. While it is true that the more nearly the particle approaches a sphere the freer its surface is from sharp corners and abrupt changes, it is not necessary that they assume this shape. Since the area of contact between two particles is so minute, the modulation action of the material is largely independent of the overall shape of the particle. However, as above explained, the aging quality and other properties of the material are greatly improved by the well rounded, smooth, hard-surfaced particles produced by our method.

What is claimed is:

1. The method of producing a microphonic particle which comprises treating a granule of silica gel with heat to intumesce the granule and lower its particle density.

2. The method of making a microphonic material which comprises, reducing a quantity of silica gel to granules, dropping said granules through a zone heated to a temperature sufficient to fuse the substance and intumesce the granules by reason of the expansion and entrapping of the gas within the cells of the granules, and coating the resultant intumesced granules.

3. A microphonic particle having a base of intumesced silica gel.

4. A microphonic particle comprising a base of intumesced silica gel covered with a conducting substance.

5. A microphonic particle having a particle density less than unity comprising an intumesced granule of silica gel with a smooth, continuous, external surface, and a coating of pure carbon on said external surface.

6. The method of making a microphonic material which comprises reducing a quantity of silica gel to particles, dropping said particles through a heated zone to fuse and intumesce them to a volume corresponding to a density less than unity, and coating the intumesced particles with carbon.

7. The method of making a microphonic material which comprises reducing a quantity of silica gel to particles, dropping said particles through an atomic-hydrogen flame to fuse and intumesce the particles to a volume corresponding to a density less than unity, and depositing a coating of substantially pure carbon on the external surfaces of said intumesced particles.

CARL J. CHRISTENSEN.
FREDERICK S. GOUCHER.
HERMAN G. WEHE.